Aug. 27, 1963   A. J. ROSS   3,101,598
METHOD AND APPARATUS FOR FREEZING LIQUIDS
Filed June 24, 1959   3 Sheets-Sheet 1
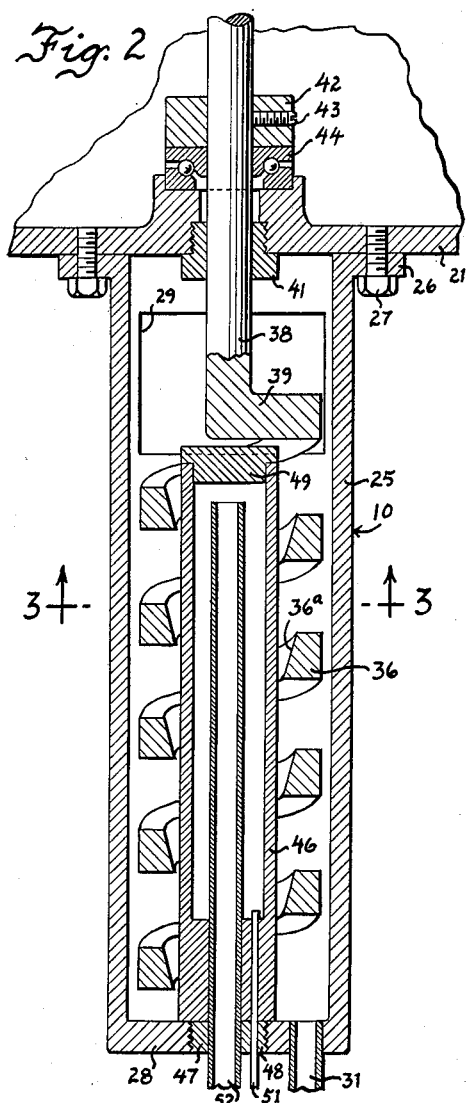
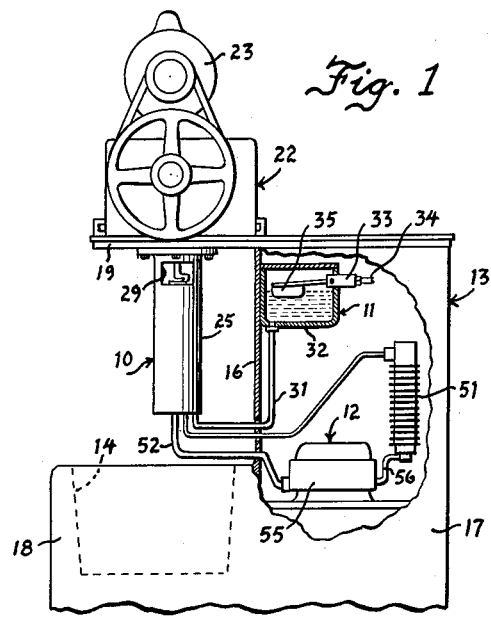
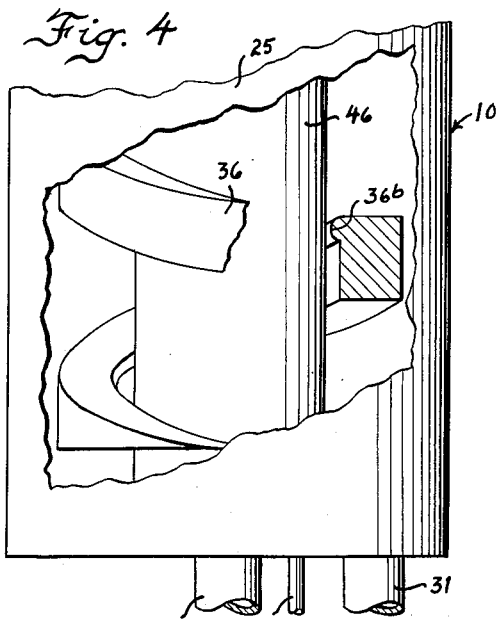
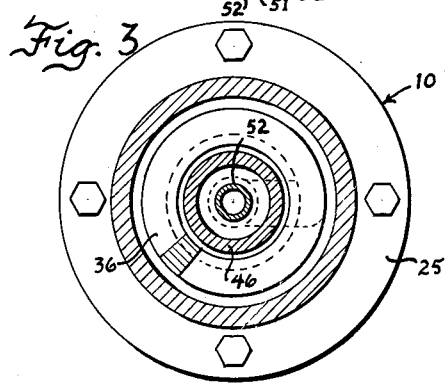
Inventor
Anthony J. Ross
By McCanna and Morsbach
Atty's Aug. 27, 1963
A. J. ROSS
3,101,598
METHOD AND APPARATUS FOR FREEZING LIQUIDS
Filed June 24, 1959
3 Sheets-Sheet 2
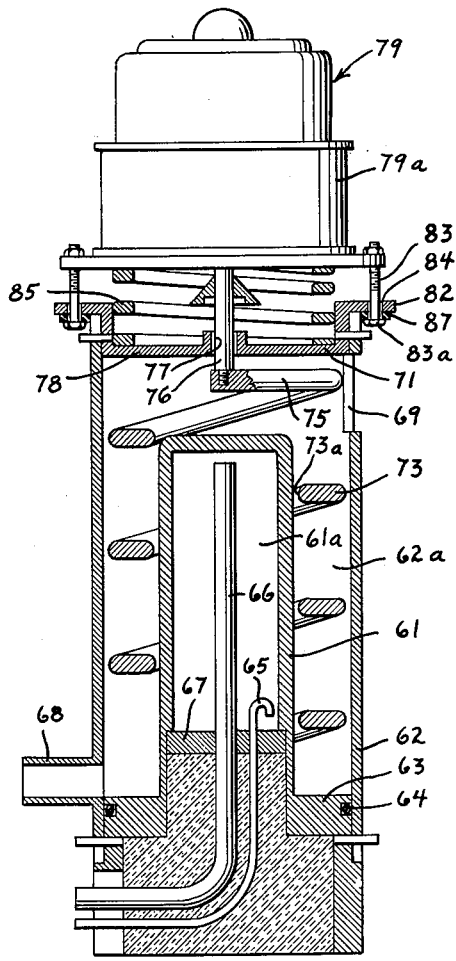
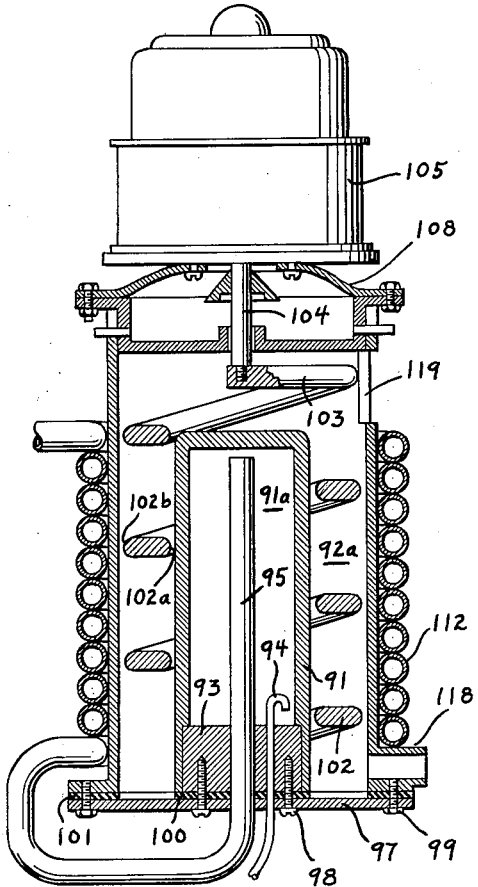
Inventor
Anthony J. Ross
By McCanna, Morsbach & Pillote
Atty's Aug. 27, 1963  A. J. ROSS  3,101,598
METHOD AND APPARATUS FOR FREEZING LIQUIDS
Filed June 24, 1959  3 Sheets-Sheet 3
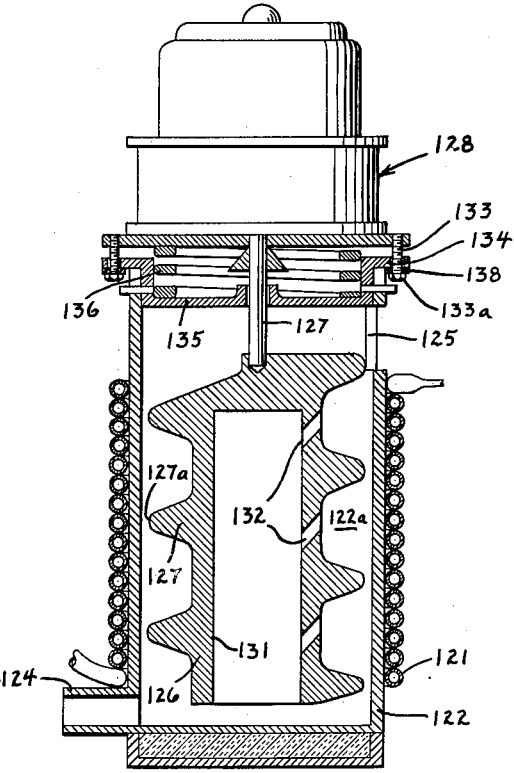
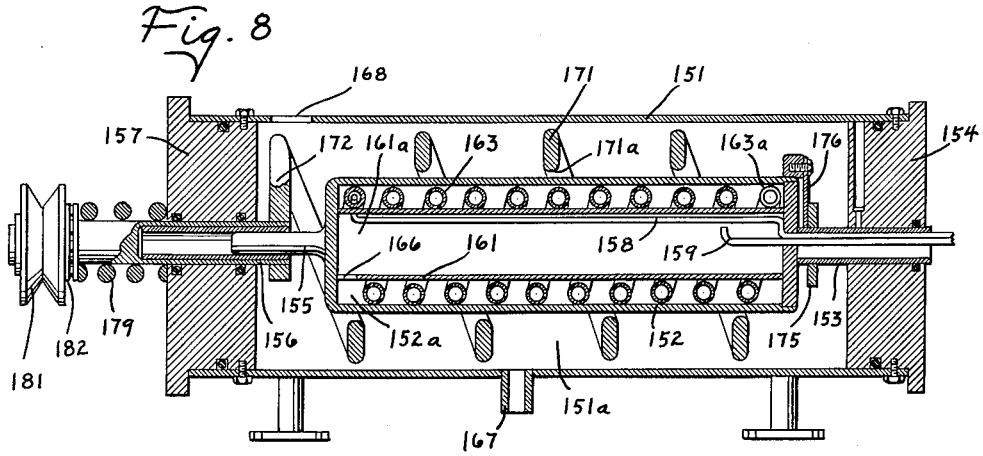
Inventor
Anthony J. Ross
By McCanna, Morsbach & Pillote
Atty's United States Patent Office 3,101,598
Patented Aug. 27, 1963

3,101,598
METHOD AND APPARATUS FOR
FREEZING LIQUIDS
Anthony J. Ross, 116 Myrtle Ave., Elmhurst, Ill.
Filed June 24, 1959, Ser. No. 822,516
36 Claims. (Cl. 62—71)

This invention relates to the freezing of liquids and particularly to improvements in a freezing apparatus of the type having an annular refrigerated surface and a coaxial device for removing the frozen liquid from the freezing surface.

Liquid freezing apparatus have heretofore been made employing a screw-type ice removing auger disposed within a cylindrical freezing surface. In general, the prior machines of this type did not operate to completely separate the layer of frozen liquid from the freezing surface, but instead scraped or sheared off a relatively slushy mass from the surface of the frozen layer. That portion of the frozen layer which remained on the freezing surface retarded the heat transfer between the liquid and the freezing surface and necessitated a correspondingly larger freezing surface for any selected ice making capacity. Moreover, such machines required a relatively large amount of power to rotate the auger, due in part to the relatively large freezing area required, and also to the scraping or shearing action employed and which only removed a portion of the frozen layer. In addition, such machines required rigid radial bearings for both ends of the auger and accurate machining of the auger and freezing surface to maintain the proper clearances therebetween.

It is an important object of the present invention to provide a freezing apparatus of the type described which will produce a frozen liquid in an improved flake or wafer form.

Another object of this invention is to provide a freezing apparatus of the type described having an improved ice removing device which will completely separate the layer of frozen liquid from the freezing surface to provide more efficient heat transfer between the liquid and the freezing surface and greater ice making capacity for any size freezing surface.

Another object of this invention is to reduce the power required to drive the ice removing device to enable the use of small inexpensive drive motors.

Various other objects of this invention are to provide a freezing apparatus having a helical ice removing screw which does not require accurate machining and close clearances between the freezing surface and the ice removing screw; which does not require rigid bearing at both ends of the screw; which can be easily and economically manufactured, and which is reliable and efficient in operation.

An important feature of the present invention resides in the arrangement of a screw-type ice removing surface which is yieldably supported for limited axial movement relative to the freezing surface so that the ice removing surface can screw along the freezing surface as the frozen layer builds up in thickness to gradually increase the pressure on the frozen layer in a direction parallel to freezing surface until the frozen layer separates from the freezing surface.

Another important feature of the present invention resides in the arrangement of the freezing surface internally of the helical ice removing surface to provide more efficient operation of the liquid freezing apparatus.

Still another feature of this invention resides in the provision of a resilient axially expansible and contractible helical coil for removing the frozen liquid from the freezing surface and which coil is arranged to axially elongate and contract as it engages the frozen layer to apply a yieldable pressure to the frozen layer in a direction parallel to the freezing surface and effect separation of the frozen layer from the freezing surface.

Yet another feature of this invention resides in the provision of a rotary ice removing device having a rounded ice engaging surface which tends to ride over the ice layer on the freezing surface until the pressure applied to the ice layer is sufficient to break the bond between sections of the ice layer and the freezing surface.

These, together with various ancillary objects and advantages of this invention will be more readily appreciated as the same is better understood by reference to the following detailed description when taken in connection with the accompanying drawings wherein:

FIGURE 1 is a fragmentary side elevational view of one form of liquid freezing machine, with parts of the housing broken away to illustrate the connections to the refrigerating mechanism and the liquid control mechanism;

FIG. 2 is a longitudinal sectional view through the freezing apparatus of FIGURE 1;

FIG. 3 is a transverse sectional view taken on the plane 3—3 of FIG. 2;

FIG. 4 is a fragmentary view of the freezing apparatus having a modified form of ice removing screw;

FIG. 5 is a longitudinal sectional view through another form of liquid freezing apparatus employing an axially expansible and contractible screw and an axially resilient support for the screw drive shaft and motor;

FIG. 6 is a longitudinal sectional view through a different form of liquid freezing apparatus in which the internal evaporator and the ice removing screw are resiliently supported on the outer casing to enable limited relative axial movement therebetween;

FIG. 7 is a longitudinal sectional view through an additional form of liquid freezing apparatus employing a rigid screw which is yieldably supported for limited axial movement relative to the annular freezing surface;

FIG. 8 is a longitudinal sectional view through still another liquid freezing apparatus which is adapted to be mounted in a generally horizontal position.

The present invention relates particularly to improvements in the liquid freezing apparatus or head of a continuous type machine and is a continuation-in-part of my copending application for "Ice Making Machine," Serial No. 627,840, filed December 12, 1956.

In liquid freezing apparatus such as ice making machines, the liquid to be frozen is applied to a refrigerated surface to produce a frozen layer of progressively increasing thickness. However, as the thickness of the layer increases, the rate of heat transfer through the layer decreases. Therefore, to maintain high efficiency and reduce the overall size of the freezing area required for any selected ice making capacity, it is advantageous to completely remove the layer of frozen liquid from the freezing surface.

In order to separate the frozen layer from the freezing surface it is necessary to overcome the bonding strength of the frozen layer. In the prior freezing apparatus of the type employing an ice removing screw, the screw was rigid and was rigidly supported for rotation inside a cylindrical freezing surface. The ice engaging edge or surface on the screw moved along a path parallel to the freezing surface and as soon as the frozen layer built up sufficient to contact the ice engaging edge of the screw, the screw would shear off the somewhat slushy surface of the frozen layer. However, the force applied by the screw to the ice layer was not sufficient to overcome the bonding force so that the frozen layer was not completely separated from the freezing surface. This necessitated a large freezing area for any selected freezing capacity; a large amount of torque to drive the screw, and accurate machining and fitting of the relatively rotating screw and freezing surface.

It has been found that the frozen layer of liquid can be completely separated from the freezing surface in relatively large sections or flakes by yieldably supporting the helical ice engaging surface to permit limited relative axial movement between the ice engaging surface and the freezing surface. When the resiliently supported ice engaging surface engages the surface of the frozen layer, it tends to screw along the layer. This gradually increases the pressure applied by the ice removing screw to the frozen layer in a direction parallel to the freezing surface until the bonding force is overcome in the adjacent section of the frozen layer and the layer separates from the freezing surface. It is considered that the gradual increase in the pressure on the frozen layer in a direction parallel to the freezing surface is a major factor in causing the rupture of the bonding force before the frozen layer fails in compression or shear. In addition, since the ice engaging surface of the screw can shift axially as the screw is rotated, the ice layer can build up somewhat between the convolutions of the ice removing screw to increase the bearing area between the ice removing surface and the frozen layer and thereby further reduce the tendency of the layer to fail in compression or shear. It is also considered that the yieldable pressure applied to the frozen layer in a direction parallel to the freezing surface is advantageous in that it will take advantage of any decrease in the bonding force which may occur while the yieldable pressure is applied to the frozen layer, such as may result from the changes in temperature at the freezing surface as the ice layer increases in thickness. In practice, the yieldable ice removing screw completely separates the frozen layer from the freezing surface in relatively large sections or flakes. Thus, the different areas of the freezing surface are, from time to time, directly exposed to the liquid to be frozen to provide rapid and efficient heat transfer. This enables the production of large quantities of frozen products with small size freezing heads. In addition, the power required to remove the frozen layer from the surface is markedly less for any selected size of freezing apparatus, than the prior screw-type units. Further, the frozen product is in an improved flake form which stores better than snow or slush ice.

The freezing apparatus 10 of the present invention forms a part of a continuous type liquid freezing machine, which machine generally includes, in addition to the freezing apparatus, a mechanism 11 for controlling the flow to the freezing apparatus of the liquid to be frozen and a refrigerating mechanism 12 for freezing the liquid in the freezing apparatus. In the embodiment illustrated, the freezing apparatus and associated mechanism are mounted on a housing 13 which encloses the flow control mechanism 11 and the refrigerating mechanism 12 and has a receptacle or bin 14 thereon for collecting the frozen liquid discharged from the freezing apparatus. It is to be understood, however, that the freezing apparatus 10 may be used independent of any specific housing and may, in some applications, be arranged to discharge the frozen liquid directly onto the products to be chilled.

The specific housing 13 illustrated in FIGURE 1 of the drawings includes a front wall 16 and opposed side walls 17 which define an enclosure for the flow control mechanism 11 and the refrigerating apparatus 12. A forwardly extending apron 18 is provided on the lower end of the housing and supports the receptacle 14 for receiving the frozen liquid. The freezing apparatus 10 is mounted on a horizontally disposed frame 19 which is secured to the upper end of the housing 13. In particular, the freezing apparatus 10 is, as shown in FIGURE 2, secured to the underside 21 of the housing of a speed reducing apparatus 22, which speed reducing apparatus is mounted on the forwardly projecting portion of the frame 19. The freezing apparatus 10 is operatively connected to the speed reducing mechanism 22 and is driven thereby from a motor 23 herein shown mounted on top of the speed reducing mechanism. As best shown in FIGURE 1, the freezing apparatus 10 overlies the receptacle 14 so that the frozen liquid discharged therefrom falls into the receptacle.

The freezing apparatus 10 of the embodiment of FIGS. 1–4, includes an outer casing or jacket 25 preferably having a flange 26 formed on the upper end thereof which is detachably secured as by fasteners 27 to the bottom wall 21 of the housing on the speed reducing mechanism. The wall 21 extends across the upper end of the casing 25 and forms an upper head which prevents the entrance of dirt and foreign matter into the top of the casing. A wall 28 is provided on the bottom of the outer casing 25 and discharge openings 29 are provided adjacent the upper end of the casing to permit the frozen liquid to pass outwardly therethrough. Liquid to be frozen is supplied to the freezing chamber within the outer casing 25 through a conduit 31 which, as shown in FIGURE 2, extends through the bottom wall 28 of the outer casing. The liquid within the freezing chamber is maintained at a preselected upper level which is below the discharge openings 29 in the outer casing by the flow control mechanism 11. The flow control mechanism may be of any conventional construction and, as illustrated in FIG. 1, includes a housing 32 defining a float chamber and a valve 33 for controlling the flow of liquid from the supply conduit 34 into the float chamber. A float 35 is provided within the housing 32 and operatively connected to the valve 33 to maintain a substantially constant liquid level in the float chamber. The liquid from the float chamber flows by gravity through the conduit 31 and into the freezing chamber in the casing 25 and, when the liquid levels in the freezing chamber and in the float chamber are substantially equalized, the flow through the conduit automatically stops. Obviously, different types of liquid level control apparatus may be provided, if desired.

The ice removing device of the embodiment of FIGS. 1–4 is in the form of a resilient helical coil 36 disposed in the freezing chamber in the outer casing 25 and having an ice engaging edge or surface 36a. The coil 36 is loosely received within the outer casing 25 and is supported therein at only one end to permit axial expansion and contraction of the coil during operation of the freezing apparatus. In this embodiment, a shaft 38 is secured to or formed integrally with a radially extending portion 39 on one end of the coil 36 and provision is made for supporting the shaft against radial and axial movement. As shown in FIGURE 2, the shaft 38 extends through a seal 41 in the bottom wall 21 of the speed reducing mechanism. A collar 42 is secured to the shaft, as by a set screw 43, and engages a combination radial and thrust bearing 44 to thereby rotatably support the shaft. The collar 42 is adjusted along the shaft 38 to support the resilient coil 36 in the outer casing 25 with the remote end thereof spaced from the bottom wall 28 of the outer casing, as is clearly shown in FIGURES 2 and 3. The collar 42 rotates with the shaft and also functions as a slinger to prevent oil and the like from flowing along the shaft and through the gland 41, when the shaft is rotated.

The refrigerating chamber is advantageously disposed within the outer casing 25 internally of the helical coil 36. In the embodiment illustrated in FIGS. 1–4, the refrigerating chamber includes cylindrical inner casing 46 which is detachably secured to the outer casing 25 and defines an annular freezing surface. As shown in FIG. 2, the inner casing 46 is formed with a reduced diameter threaded extension or mounting head 47 which is threadedly received in an opening 48 in the bottom wall 28 of the outer casing to thereby support the inner casing on the outer casing and in sealed relation therewith. The remote end of the inner casing 46 is sealed by a plug 49 and a refrigerant or coolant is supplied to the chamber within the inner casing through a conduit 51. The conduit 51 extends through the extension 47 upwardly to a point adjacent the bottom of the inner casing. In order to assure complete expansion of the refrigerant in the inner casing, the return conduit 52 for the refrigerant or coolant is arranged to extend through the extension 47 on the inner casing upwardly to a point adjacent the upper end of the inner casing. Thus, the liquid refrigerant cannot flow from the chamber in the inner casing until the level thereof reaches the upper end of the return conduit and, by controlling the total quantity of refrigerant in the system such that the level of the refrigerant in the inner casing is below the end of tube 52 during operation, complete expansion of the refrigerant is assured. As shown in FIGURE 2, the chamber in the inner casing terminates at its lower end at a level above the lower end of the conveyor 36 to thereby minimize the formation of ice on the walls of the inner casing below the end of the conveyor.

The refrigerant is supplied to the freezing apparatus by the refrigerating mechanism 12. This refrigerating mechanism may be of any conventional construction and is herein shown of the mechanical type including a compressor 55 having an inlet connected to the return conduit 52 to compress the gaseous refrigerant. The liquified refrigerant which flows from the outlet of the compressor 55 passes through a conduit 56 to a condensor coil 57. The liquified refrigerant, after being cooled in the condenser coil 57, passes through the conduit 51 into the chamber within the inner casing 46. In the embodiments illustrated, the conduit 51 is a capillary tube, it being understood that an expansion valve may be used, if desired.

In operation, the refrigerating mechanism 12 is operated whereby refrigerant flows through the conduit 51 and into the refrigerating chamber within the inner casing 46. The liquified refrigerant expands in the refrigerating chamber and chills the walls of the inner casing 46 to thereby freeze a thin layer of ice thereon. Since the refrigerating chamber is disposed within the body of liquid being frozen, it is apparent that it is unnecessary to insulate the refrigerating chamber or evaporator to prevent heat loss to the atmosphere. The coil type conveyor 36 is rotated at a relatively low speed in a direction to advance the frozen liquid formed on the walls of the inner casing toward the discharge opening 29. In practice, a coil speed of the order of 10 r.p.m. has been found to give good results but a relatively higher speed may also be used.

The inner edge or ice engaging surface 36a of the coil is yieldably supported by the convolutions of the coil to permit limited axial movement of the ice engaging surface relative to the freezing surface on the inner casing 46. When a layer of ice builds up on the walls of the inner chamber sufficient to engage the convolutions of the coil, the rotation of the coil is retarded. The shaft, which is connected to the upper end of the coil, turns the latter in the direction of the convolutions thereof so that the coil tends to advance the layer of ice formed on the inner casing in a direction toward the discharge opening. However, because of the bond between the ice layer and the wall of the inner evaporator casing, the ice tends to remain stationary. Consequently, continued rotation of the shaft causes the coil to tend to advance or screw along the layer of ice in a direction away from the discharge opening. Since the inner ice engaging edge or surface of the coil is yieldable in a direction parallel to the freezing surface 46, the helical coil may axially elongate slightly as the convolutions of the coil engage the film of ice. This builds up a tension in the coil in a direction to urge the layer of ice toward the discharge opening and, when the tension builds up sufficiently, the bonding face is overcome and the ice breaks away from the inner casing and moves upwardly toward the discharge opening. The fractured flakes of ice are then carried upwardly by the coil 36 to the discharge openings 29 in the outer casing.

The type of ice formed by the freezing apparatus can be varied by changing the radial spacing between the coil conveyor and the walls of the inner casing, the shape of the scraping edge on the conveyor, and the temperature maintained in the inner casing. Thus, by making the spacing between the conveyor and the inner casing very small and providing a sharp inner edge on the conveyor, finely shaved or "snow" ice may be formed. If the spacing is increased and the inner edge of the conveyor is relatively dull or rounded, then relatively thick "flakes" of ice are produced. In FIGURE 2, the ice engaging surface 36a of the coil is beveled upwardly and outwardly so that the coil tends to scrape the layer of ice on the inner casing and form "snow" ice. In the embodiment shown in FIGURE 4, the ice engaging surface of the coil is rounded as indicated at 36b. This arrangement produces "flakes" of ice.

As previously described, the lower end of the evaporator chamber terminates above the lower end of the coil 36 so as to minimize the formation of ice below the lower end of the conveyor coil. Advantageously, the lower end may be flattened as best shown in FIGURE 4 to prevent engagement with any ice which forms on the inner casing below the lower end of the conveyor coil.

It has been found that improved results can also be obtained when the ice removing screw and the freezing surface are yieldably mounted for relative axial movement to permit the entire screw to shift bodily relative to the freezing surface. Thus, during rotation of the screw the ice engaging surface on the screw can shift relative to the freezing surface due both to relative shifting between the screw and the freezing surface and to changes in the spacing between the convolutions of the resilient helical coil type screw as the latter elongates and contracts. The term "helical," as used herein, is intended to cover those screws or coils having a non-uniform lead as well as those having a uniform lead. However, in the upright models it is preferable to have the spacing between adjacent convolutions at the upper end of the screw at least as large as the spacing at the lower part of the screw to achieve proper feeding of the frozen product to the discharge outlet.

In the form shown in FIG. 5, an internal evaporator casing 61 is disposed within an outer casing or jacket 62. The outer casing surrounds a head 63 on the lower end of the evaporator casing and is sealed thereto by an O-ring 64, as more fully disclosed and claimed in the applicant's co-pending application Serial No. 809,285, filed April 27, 1959. The refrigerant inlet and return conduits 65 and 66 extend upwardly through a plug 67 into the evaporator chamber 61a and are connected to a suitable refrigeration mechanism such as shown in FIGURE 1. The liquid to be frozen is supplied to the outer liquid chamber 62a through a fitting adapted for connection to the liquid supply line 31. A frozen product discharge opening 69 is provided adjacent the upper end of the outer casing.

A resilient axially expansible and contractible helical coil 73 having a preferably dull ice engaging surface 73a, is disposed around the freezing surface on the inner evaporator casing and is spaced slightly therefrom to allow the frozen layer to build up to a preselected thickness before the screw engages the frozen layer. An inwardly extending arm 75 is provided on the upper end of the coil and is non-rotatably attached to the drive shaft 76. In this embodiment, the drive shaft is supported on the outer casing for limited axial movement relative to the outer casing and to the inner casing attached to the outer casing. As shown, the shaft 76 slidably and rotatably extends through an opening 77 in a head 78 attached to the upper end of the outer casing 62. The shaft is driven by a motor unit 79 having a speed reducing mechanism 79a. The speed reducing mechanism has thrust bearings (not shown) which inhibit axial movement of the shaft relative thereto, and the motor unit is yieldably supported on the head to permit floating movement of the screw 73. The head has an outwardly extending flange 82 thereon and a plurality of annularly spaced pins 83 are attached to the motor unit and slidably extend through openings 84 in the flange 82 to support the motor unit for limited axial movement. A spring 85 is interposed between the head 78 and the motor unit 79 to yieldably oppose movement of the motor unit and the attached screw 73 in the direction of advance of the screw along the frozen layer, when the screw is rotated. Heads 83a are provided on the ends of the pins and resilient shock absorbing pads or bumpers 87 are interposed between the heads 83a and the flange 82. The spring 85 is arranged to yield when the ice engaging surface 73a on the screw engages the frozen layer on the freezing surface to permit the ice engaging surface to screw therealong and gradually increase the pressure applied to the ice layer in a direction parallel to the freezing surface. The resilient helical coil will also expand and contract as it screws along the frozen layer and, by varying the relative strength of the spring 85 and the resilient coil 73, the relative expansion of the coil 73 and the compression of spring 85 can be varied. However, it is considered preferable to use a spring 85 which is somewhat less stiff than the coil 73 to enhance the floating action of the entire screw. Additionally, this mounting of the motor and screw permits some radial floating and tilting movement of the screw relative to the freezing surface. This permits the coil 73 to align itself with the freezing surface and prevents excessive wear on the freezing surface.

A further modification is illustrated in FIG. 6. In this embodiment there is provided an internal evaporator 91 which is disposed within an outer casing 92. The inner evaporator has a plug 93 in its lower end and refrigerant inlet and return conduits 94 and 95 which extend into the evaporator chamber 91a. The inner casing is resiliently supported by a flexible diaphragm or plate 97 on the lower end of the outer casing, as by fasteners 98 and 99 and is sealed thereto by gaskets 100 and 101. A resilient ice removing coil 102 is disposed within the outer chamber 92a around the internal evaporator and has an arm 103 at its upper end attached to the drive shaft 104 of a motor and speed reducing unit 105. The motor is preferably resiliently supported, and is herein shown mounted by a diaphragm type spring 108 on a head 109 attached to the upper end of the outer casing. Thus, the internal evaporator can shift axially relative to the outer casing, and the motor and attached coil 102 can also shift axially relative to the outer casing. In addition, the coil is resilient to enable axial expansion and contraction. Liquid to be frozen is supplied to the liquid chamber 92a through a fitting 118 and the frozen product is discharged through an opening 119 adjacent the upper end of the outer casing.

The outer casing may also be refrigerated, as by an evaporator tube 112 wound therearound to provide concentric inner and outer freezing surfaces, and the expansible coil 102 is provided with inner and outer preferably dull ice engaging surfaces 102a and 102b which are slightly spaced from freezing surfaces on the inner and outer casings, respectively. Thus, the relative axial movement between the ice engaging surfaces on the coil 102, due to axial expansion and contraction of the coil, is augmented by the axial floating of the motor and attached coil relative to the outer casing and the axial floating of the inner casing relative to the outer casing.

In the embodiment shown in FIG. 7, an evaporator tube 121 is disposed around the outer casing 122 to effect freezing of liquid on the inner wall of the center casing. Liquid is supplied to the liquid chamber 122a through a fitting 124 and frozen product is discharged through a discharge opening 125. A screw 126 is disposed within the casing and is attached at one end to a shaft 127 of a motor drive unit 128. The screw 126 is axially and radially rigid and has a helical rib 127 thereon defining a helical ice engaging surface 127a which is spaced slightly from the freezing surface on the outer casing. The screw is advantageously formed with an axial passage 131 which extends inwardly from one end and one or more lateral passages 132 for distributing the liquid to be frozen along the length of the screw. The screw is yieldably supported for limited movement in a direction axially of the freezing surface by pins 133 which are attached to the motor unit and slidably extend through openings 134 in a flanged head 135 non-rotatably attached to the upper end of the outer casing. A spring 136 yieldably urges the screw in a direction opposite the direction of advance of the screw along the freezing surface on the outer casing, when the screw is rotated. Heads 133a are formed on the pins 133 and engage resilient shock absorbing pads 138 when the screw and motor move upwardly.

The embodiment shown in FIG. 8 is designed for operation in a generally horizontal position, and includes an outer casing 151 and an internal evaporator 152. The evaporator is supported at one end by a tube 153 non-rotatably mounted in a head 154 attached to the outer casing. The other end of the evaporator is supported by a trunnion 155 which is rotatably received in a tubular drive shaft 156 mounted in a head 157 at the other end of the outer casing. Refrigerant inlet and return conduits 158 and 159 extend through the tube 153 into the evaporator, and a sleeve 161 is mounted in the evaporator to define an accumulator chamber 161a inside the sleeve, and an evaporator chamber 152a, between the sleeve and the outer casing. The refrigerant inlet 158 communicates with one end of a helical tube 163 located in the evaporator chamber so that the refrigerant follows a helical path around the inner wall of the evaporator casing from one end to the other end thereof. The end 163a of the tube 163 communicates with the evaporator chamber so that the refrigerant flows between the convolutions of the tube 163 back to the first-mentioned end of the evaporator chamber and then through an opening 166 into the accumulator chamber. The return conduit 159 communicates with the accumulator chamber adjacent its upper side.

The liquid to be frozen is supplied to the liquid chamber 151a through a fitting 167 and the frozen product is discharged through an opening 168. A resilient axially expansible and contractible helical coil 171 is disposed around the evaporator casing and has one end 172 attached to the shaft 156. The other end of the coil is slidably and rotatably mounted on the tube 153 by means of a slidable bearing 175 and an arm 176.

The axially expansible and contractible coil 171 is adapted to elongate and contract as the dull ice engaging surface 171a thereof engages the frozen layer on the evaporator and screws therealong. In addition, the shaft 156 is slidably mounted in the head 157 and a spring 179 is provided for yieldably opposing movement of the shaft and screw in the direction of advance of the screw as the latter is rotated. As shown, the shaft is driven by a motor (not shown) connected to a pulley 181 on the shaft and a thrust bearing 182 is interposed between the spring and the pulley to permit free rotation therebetween.

In each of the embodiments of FIGS. 5–8, the ice removing screw is supported for limited axial movement relative to the freezing surface of the evaporator to permit the screw to advance therealong and a spring is provided to gradually increase the pressure on the screw in a direction parallel to the freezing surface to separate the frozen layer therefrom. In the embodiments of FIGS. 5, 6 and 8, the coil is also axially expansible and contractible and the relative axial movement between the ice engaging surface of the coil and the freezing surface, due to axial shifting of the coil, is supplemented by the axial shifting produced by elongation and contraction of the coil. Thus, in each of the embodiments, the ice engaging surface is supported to permit the same to screw along the frozen layer and to gradually increase the pressure in a direction parallel to the freezing surface. With this arrangement, the screw is adapted to completely remove the frozen layer in sections or flakes from the freezing surface. This provides more efficient heat transfer; reduces the overall size of the unit required for a selected ice making capacity, permits the use of relatively small motors to drive the screw, and produces an improved frozen product.

I claim:

1. An apparatus for freezing liquids comprising, an outer casing having a discharge opening adjacent one end thereof, an inner casing disposed within said outer casing and defining a chamber therebetween, means communicating with said chamber for supplying a liquid to be frozen thereto, means for chilling the walls of said inner casing sufficient to effect freezing of a layer of liquid thereon, a resilient axially expansible and contractible helical coil disposed in said chamber between said outer and inner casings and loosely surrounding the latter, and means attached to the end of said coil adjacent said discharge opening for rotating said coil in a direction to advance the frozen liquid on said inner casing toward said discharge opening.

2. An apparatus for freezing liquids comprising, an outer casing having a discharge opening adjacent one end thereof, an inner casing disposed within said outer casing and defining a chamber therebetween, means communicating with said chamber for supplying a liquid to be frozen thereto, means for chilling the walls of said inner casing sufficient to effect freezing of a layer of liquid thereon, a resilient axially expansible and contractible helical coil disposed in said chamber between said outer and inner casings and loosely surrounding the latter, means attached to the end of said coil adjacent said discharge opening for rotatably supporting the coil in said chamber, said last mentioned means providing the sole support for said coil and supporting the latter with the other end thereof spaced axially from the other end of the outer casing, and means attached to the end of said coil adjacent said discharge opening for rotating said coil in a direction to advance the frozen liquid on said inner casing toward the discharge opening.

3. A freezing device comprising a drum shaped chilling wall, means for cooling said wall sufficient to effect freezing of a liquid thereon, means for removing frozen liquid from said chilling wall comprising a resilient axially expansible and contractible helical coil disposed coaxially of said chilling wall and in closely spaced adjacency thereto, and means attached to one end of said helical coil for rotating the coil relative to said chilling wall and for supporting said one end of said coil against axial movement relative to said chilling wall, the convolution of said coil forming the sole connection between said one end of said coil and the other end of said coil whereby said coil is free to axially elongate and contract during operation of said freezing device to resiliently urge the ice layer formed on the chilling wall in a direction axially of said wall.

4. A freezing device comprising a drum shaped chilling wall, means for cooling said wall sufficient to effect freezing of a liquid thereon, means for removing frozen liquid from said chilling wall comprising a resilient axially expansible and contractible helical coil disposed around said chilling wall having an inner diameter dimensioned to loosely receive the same, and means connected to one end of said coil for effecting relative rotation between said coil and said chilling wall, the convolutions of said coil forming the sole connection between said one end of said coil and the other end thereof whereby said coil is free to axially expand and contract during operation of said freezing device.

5. A freezing device comprising a drum shaped chilling wall closed at one end thereof, means for cooling said wall sufficient to effect freezing of a layer of liquid thereon, means for removing frozen liquid from said chilling wall comprising a resilient axially expansible and contractible helical coil disposed around said chilling wall and having an inner diameter dimensioned to loosely receive the same, a shaft attached to one end of said coil and overlying said closed end of said chilling wall in axial alignment therewith, and means for rotating said shaft relative to said chilling wall, the convolutions of said coil forming the sole connection between said one end of said coil and the other end thereof whereby to permit free axial expansion and contraction of said coil during operation of said freezing device.

6. An apparatus for producing a flake ice product comprising an outer casing adapted to receive liquid to be frozen, a drum shaped inner casing disposed in said outer casing to be substantially immersed in the liquid in said outer casing, means for supplying refrigerant to said inner casing to cool the side walls thereof and effect freezing of a layer of liquid on the outer surface thereof, an ice removing device having a helical ice removing surface surrounding said inner casing and having an inner diameter dimensioned to loosely receive said inner casing, said ice removing surface being blunt and converging toward said freezing wall at a shallow angle in a direction from the lead face toward the trailing face thereof and means for rotating said ice removing device relative to said inner casing to effect removal of the layer of frozen liquid on the outer surface of the inner casing.

7. An apparatus for freezing liquids comprising an outer casing adapted to receive liquid to be frozen, a drum shaped inner casing disposed in said outer casing to be substantially immersed in the liquid in said outer casing, means for passing refrigerant through said inner casing to cool the side walls thereof sufficient to effect freezing of a layer of liquid on the outer surface thereof, an axially expansible and contractible helical coil surrounding said inner casing and having an inner diameter dimensioned to receive said inner casing, the convolutions of said coil forming the sole connection between opposite ends of said coil whereby said coil is free to elongate and contract, and means for rotating said coil relative to said inner casing to effect removal of the layer of frozen liquid on the outer surface of said inner casing.

8. The combination of claim 7 wherein said outer casing is disposed adjacent said coil to confine the flakes of ice removed from the inner casing between adjacent convolutions of said coil.

9. An apparatus for freezing liquids comprising an outer casing closed at one end and having a discharge opening adjacent the other end thereof, a drum shaped inner casing disposed in said outer casing and defining a chamber therebetween, means communicating with said chamber for supplying liquid to be frozen thereto, means for chilling the walls of said inner casing sufficient to effect freezing of a layer of liquid on the outer surface thereof, an elongated resilient helical coil having an inner diameter dimensioned to receive said inner casing, said coil being disposed in said chamber and loosely surrounding said inner casing, a shaft on one end of said coil non-slidably and rotatably supported in alignment with the axis of said inner casing, the other end of said coil terminating in axially spaced relation to said closed end of said outer casing, the convolutions of said coil forming the sole connection between said one end of said coil and said other end thereof whereby said coil is free to axially elongate and contract as said coil is rotated, and means for rotating said coil relative to said inner casing in a direction to advance the frozen liquid formed on said inner casing in a direction toward said discharge opening, said helical coil being adapted to engage the layer of ice which forms on said inner casing and to screw therealong to thereby axially expand said coil until the pressure exerted by the coil on the layer of ice is sufficient to break the bond between the ice layer and the outer surface of said inner casing.

10. An apparatus for freezing liquids comprising an outer casing closed at one end and having a discharge opening adjacent the other end thereof, a drum shaped inner casing disposed in said outer casing and defining a liquid chamber therebetween, said inner casing having one end thereof attached to said one end of said outer casing, means defining a seal across said inner casing at a point spaced above said one end of said outer casing, means for closing the other end of said inner casing to define a refrigerant chamber therein above said seal, means for passing refrigerant through said refrigerant chamber, an elongated resilient helical coil having an inner diameter dimensioned to receive said inner casing, said coil being disposed in said liquid chamber and loosely surrounding said inner casing, a shaft attached to one end of said coil and non-slidably and rotatably supported in alignment with the axis of said inner casing, the other end of said coil terminating at a point above said one end of said outer casing and below said seal in said inner casing, the convolutions of said coil forming the sole connection between said one end of said helical coil and the other end thereof whereby said coil is free to axially elongate and contract as the coil is rotated.

11. An apparatus for freezing liquids comprising an annular freezing surface, means for supplying a liquid to be frozen to said surface, means for refrigerating said surface to freeze a layer of liquid thereon, an ice removing device having an arcuate ice engaging surface generally coaxial with said freezing surface and inclined to a plane normal to the axis of the freezing surface, means including said device for supporting said ice engaging surface and said freezing surface for relative rotation therebetween and for limited relative axial movement, drive means for effecting relative rotation between said ice engaging surface and said freezing surface about the axis of said freezing surface, said supporting means including resilient means yieldably opposing relative axial movement between said freezing surface and said ice engaging surface to progressively increase the pressure applied by the ice engaging surface to the layer of frozen liquid in a direction axially of said freezing surface to break the bond between the frozen layer and said freezing surface.

12. An apparatus for freezing liquids comprising an annular freezing surface, means for supplying liquid to be frozen to said surface, means for refrigerating said surface to freeze a layer of liquid thereon, an ice removing device having an arcuate ice engaging surface generally coaxial with said freezing surface, means including said device for supporting said ice engaging surface and said freezing surface for relative rotation therebetween and for limited relative axial movement, drive means for effecting relative rotation between said ice engaging surface and said freezing surface about the axis of said freezing surface, said ice engaging surface being inclined to a plane normal to the axis of said freezing surface in screw fashion and defining a smoothly rounded edge spaced slightly from the freezing surface to engage the layer of frozen liquid and screw therealong when the layer exceeds a minimum thickness, said supporting means including resilient means yieldably opposing relative axial movement between said ice engaging surface and the freezing surface to progressively increase the pressure applied to the section of the layer engaged by said ice engaging surface in a direction parallel to the plane of the bond between the layer and the freezing surface to break the bond.

13. An apparatus for freezing liquids comprising an annular freezing surface, means for supplying liquid to be frozen to said surface, means for refrigerating said surface to freeze a layer of liquid thereon, an ice removing device having an arcuate ice engaging surface extending around said freezing surface in closely spaced adjacency thereto, means including said device for supporting said ice engaging surface and said freezing surface for relative rotation therebetween and for limited relative axial movement, drive means for effecting relative rotation between said ice engaging surface and said freezing surface, said ice engaging surface being inclined to a plane normal to the axis of said freezing surface in screw fashion to engage the layer of frozen liquid and screw therealong when the layer exceeds a minimum thickness, said supporting means including resilient means yieldably opposing relative axial movement between said ice engaging surface and said freezing surface to progressively increase the pressure applied by the ice engaging surface to the layer of frozen liquid in a direction parallel to the freezing surface to break the bond between the layer and the freezing surface.

14. An apparatus for freezing liquids comprising an annular freezing surface, means for supplying liquid to be frozen to said surface, means for refrigerating said surface to freeze a layer of liquid thereon, an ice removing device having a helical ice engaging surface generally coaxial with said freezing surface, said ice engaging surface including a plurality of convolutions, means including said device for supporting said freezing surface and said ice engaging surface for relative rotation therebetween and for limited relative axial movement, drive means for rotating said ice engaging surface relative to said freezing surface, said supporting means including resilient means yieldably opposing relative axial movement between said freezing surface and said ice engaging surface to gradually increase the pressure applied by the ice engaging surface to the layer of frozen liquid in a direction axially of the freezing surface to break the bond between the frozen layer and the freezing surface.

15. An apparatus for freezing liquids comprising, an annular freezing surface, means for supplying the liquid to be frozen to said surface, means for refrigerating said surface to freeze a layer of liquid thereon, an ice removing device having a helical ice engaging surface disposed substantially coaxially of said freezing surface and in closely spaced adjacency thereto, means for supporting said ice removing device and said freezing surface for relative rotation therebetween and for limited relative axial movement, drive means for effecting relative rotation between said ice removing device and said freezing surface, said supporting means including resilient means yieldably opposing relative axial movement between said freezing surface and said ice removing device to gradually increase the pressure applied by the ice removing device to the frozen layer in a direction axially of the freezing surface.

16. The combination of claim 15 wherein said ice removing device comprises a resilient axially expansible and contractible helical coil whereby the coil can axially expand and contract when the ice engaging surface thereon contacts the freezing wall.

17. The combination of claim 15 wherein said ice removing device comprises an axially rigid member.

18. An apparatus for freezing liquids comprising, an annular freezing surface, casing means extending around said surface for storing a quantity of liquid in contact with said freezing surface, means for refrigerating said surface to freeze a layer of liquid thereon, an ice removing device surrounding said freezing surface and having a helical ice engaging surface disposed substantially coaxial with said freezing surface and in closely spaced adjacency thereto, a first mounting means attaching said ice removing device on said casing means for rotation relative thereto, means for rotating said ice removing device relative to said freezing surface, a second mounting means attaching said freezing surface on said casing means, one of said mounting means including resilient means yieldable in a direction axially of said freezing surface to permit relative axial movement between said freezing surface and said ice engaging surface, said resilient means yieldably opposing such relative axial movement to gradually increase the pressure applied by the ice removing device to the layer of frozen liquid in a direction parallel to the freezing surface.

19. The combination of claim 18 wherein said resilient means is in said first mounting means.

20. The combination of claim 18 wherein said resilient means is in said second mounting means.

21. The combination of claim 18 wherein said helical ice removing device comprises an axially expansible and contractible helical coil adapted to elongate and contract as it contacts the layer of frozen liquid on the freezing surface.

22. An apparatus for freezing liquids comprising, an annular freezing surface, casing means surrounding said surface for storing a quantity of liquid in contact with the freezing surface, means for refrigerating the surface to freeze a layer of liquid thereon, an ice removing device surrounding said freezing surface and having a helical ice engaging surface disposed substantially coaxial with said freezing surface and in closely spaced adjacency thereto, a head extending across one end of said casing, drive means including a motor having a shaft extending through said head and attached to one end of said ice removing device, resilient means interposed between said head and said drive means for supporting said device for limited floating movement to permit said ice removing device to align itself with the layer of frozen liquid on the freezing surface, said resilient means yieldably urging said drive means and said ice removing device axially in one direction relative to said freezing surface to progressively increase the axial pressure on the frozen layer engaged by the ice removing device.

23. The combination of claim 22 wherein said ice removing device comprises a resilient axially expansible and contractible helical coil.

24. An apparatus for freezing liquids comprising, an annular casing for storing a quantity of liquid and defining a freezing surface on the inner wall thereof, means surrounding said casing for refrigerating said freezing surface to freeze a layer of liquid thereon, an ice removing device having a helical ice engaging surface along the outer periphery thereof disposed substantially coaxial with said freezing surface and in closely spaced adjacency thereto, a head extending across one end of said casing, drive means including a motor having a shaft extending through said head and attached to one end of said ice removing device, resilient means interposed between said head and said drive means for supporting said device for limited floating movement to permit said device to align itself with the frozen layer on the freezing wall, said resilient means yieldably urging said drive means and said ice removing device axially in one direction relative to said freezing surface to progressively increase the axial pressure on the frozen layer engaged by the ice removing device.

25. The combination of claim 24 wherein said ice removing device comprises a hollow axially expansible and contractible helical coil in which the convolutions of the coil form the sole connection between the ends thereof, and an internal evaporator extending into said hollow coil and defining a second freezing surface on the outer wall thereof, said coil having a second helical ice engaging surface on the inner periphery thereof.

26. An apparatus for freezing liquids comprising, an annular outer casing for storing a quantity of liquid and defining a first freezing surface on the inner wall thereof, an ice removing device comprising a hollow resilient axially expansible and contractible helical coil having inner and outer helical ice engaging surfaces on the inner and outer surfaces thereof, the convolutions of said coil forming the sole connection between the ends of the coil, an inner evaporator casing extending into said hollow coil and defining a second freezing surface on the outer wall thereof, resilient means connecting said inner and outer casings for limited relative axial movement therebetween, means for refrigerating said inner and outer casings to freeze a layer of liquid on said first and second freezing surfaces, and means for rotating said ice removing device relative to said inner and outer casings.

27. A method of freezing a liquid comprising, supplying the liquid to be frozen to an annular refrigerated surface to freeze a layer of progressively increasing thickness on the surface, rotating an ice removing device having a blunt helical ice engaging surface relative to the freezing surface about an axis substantially coaxial with the freezing surface, supporting the ice engaging surface for limited axial movement relative to the freezing surface to allow the ice engaging surface to screw along the frozen layer when the layer contacts the ice removing surface, and yieldably opposing axial movement of the ice engaging surface to progressively increase the pressure on the ice layer in a direction along the freezing surface to break the bond between the layer and the surface.

28. An apparatus for producing a flake ice product comprising a drum shaped freezer casing defining a freezing wall, means for cooling one side of the wall sufficient to free a layer of liquid on the other side thereof, a helical ice stripping device disposed coaxial with said freezer wall, and drive means for effecting relative rotation between said stripping device and said freezer wall, characterized in that the helical ice stripping device has a blunt non-cutting ice engaging surface and the ice engaging surface and the freezing wall are resiliently movable in an axial direction relative to each other according to the stress involved whereby the axial pressure applied by the stripping device to the frozen liquid on the freezing wall will progressively increase to break the bond between the frozen liquid and the casing.

29. An apparatus for freezing liquids comprising, a drum shaped casing for storing a quantity of liquid and defining a freezing surface on the inner wall thereof, means surrounding said casing for refrigerating said freezing surface to freeze a layer of liquid thereon, a rigid annular ice removing body disposed in said casing and having a helical ice engaging rib on its outer surface extending adjacent to said freezing surface, means for rotating said body relative to said casing to remove the frozen liquid from the freezing surface, means for supplying liquid to said casing, said body having a passage extending into one end thereof, and said body having a plurality of lateral openings communicating said passage with the outer periphery of the helical body between the convolutions of the rib thereon to distribute the liquid along the casing.

30. The combination of claim 29 wherein said body is yieldably supported on said casing for limited axial movement relative thereto.

31. A machine for producing a flake ice product comprising, a liquid storage vessel, a drum shaped evaporator shell disposed in said vessel, said shell being closed at one end and having means attaching the other end to said storage vessel, an ice removing device having a shaft connected to only one end thereof extending out of said vessel, said ice removing device having means on said one end thereof overlying said one end of the shell, said ice removing device extending around the shell and terminating within the vessel at a point adjacent said other end of the shell, and means extending into said shell for refrigerating said shell to freeze a layer of liquid thereon, said shell having means adjacent each end for limiting the cooling of the walls thereof to a zone intermediate the ends of said ice removing device to substantially prevent freezing of liquid at the ends thereof.

32. A machine for producing a flake ice product comprising, an inner drum shaped evaporator casing closed at one end, an outer casing extending around the inner casing in spaced relation thereto, and an end wall extending between the inner and outer casings adjacent the other end of said inner casing to form a liquid chamber therebetween, an ice removing device defining a cage-like structure extending around said inner casing, said ice removing device being open at one end thereof to enable axial insertion and removal of the ice removing device from around the inner casing and having means at the other end overlying said closed end of the inner casing and adapted for connection to a drive means, a drive means connected to said other end of said ice removing device for forceably rotating the same relative to said inner casing, means for supplying liquid to the chamber between said inner and outer casings, means extending into said inner casing for refrigerating the walls thereof to freeze a layer of liquid thereon, said inner casing having seal means extending thereacross at a point spaced inwardly of said end wall and inwardly of said one end of said ice removing device for sealing said evaporator chamber at a point spaced from said end wall to inhibit the formation of ice on said evaporator casing adjacent the open end of the ice removing device.

33. In an apparatus for producing a flake ice product comprising, a generally cylindrical ice making vessel for containing liquid to be frozen, a refrigerated ice making drum extending concentrically within the vessel from one end thereof, a spiral auger surrounding the ice making drum and having means connected to one end for turning the auger to remove and raise ice formed around the ice making drum, the improvement which comprises forming said spiral auger of a rod having a rounded ice engaging surface, the thickness of said rod measured in a direction radially of the auger being a large fraction of the radial distance of separation between the outside wall of the ice making drum and the inside wall of the ice making vessel.

34. The combination of claim 33 wherein said rod has a depth measured in a direction axially of said auger which is approximately equal to the radial thickness thereof.

35. A machine for producing a flake ice product comprising, an inner drum shaped evaporator shell, a casing extending around said inner shell in spaced relation thereto and defining a liquid chamber around said inner shell, means for maintaining said liquid chamber filled with water to a preselected level for immersing at least a substantial portion of said shell in water, means extending into said inner shell for refrigerating said shell to freeze a relatively hard layer of ice on the outer surface of the shell, an ice removing device defining a cage-like structure extending around said inner shell and mounted for rotation relative to the shell, drive means for forceably rotating said ice removing device in one direction relative to said shell, said ice removing device including an elongated member having an ice engaging surface facing the outer surface of said inner shell and extending along at least a portion of the length of the inner shell, said ice engaging surface being spaced from said inner shell a distance sufficient to allow the ice layer to build up to the desired flake thickness, said ice engaging surface having a convex cross section whereby the ice engaging surface tends to ride over the ice layer until the pressure applied to the ice layer is sufficient to break the bond between sections of the ice layer and the shell and to separate sections of the ice layer from the shell.

36. A machine for producing a flake ice product comprising, an inner drum shaped evaporator shell, a casing extending around said inner shell in spaced relation thereto and defining a liquid chamber around said inner shell, means for maintaining said liquid chamber filled with water to a preselected level for immersing at least a substantial portion of said shell in water, means extending into said inner shell for refrigerating said shell to freeze a relatively hard layer of ice on the outer surface of the shell, an ice removing device defining a cage-like structure extending around said inner shell and mounted for rotation relative to the shell, drive means for forceably rotating said ice removing device in one direction relative to said shell, said ice removing device including an elongated member having an ice engaging surface facing the outer surface of said inner shell and extending along at least a portion of the length of the inner shell, said ice engaging surface being spaced from said inner shell a distance sufficient to allow the ice layer to build up to the desired flake thickness, said ice engaging surface having a convex cross section whereby the ice engaging surface tends to ride over the ice layer until the pressure applied to the ice layer is sufficient to break the bond between sections of the ice layer and the shell and to separate sections of the ice layer from the shell, said shell having means adjacent opposite ends for limiting refrigeration of the walls of the inner shell to a zone intermediate the ends of the ice removing device to substantially prevent freezing of water at the end portions of the inner shell.

References Cited in the file of this patent
UNITED STATES PATENTS

| | | |
|---|---|---|
| 896,551 | Jurgens | Aug. 18, 1908 |
| 1,798,725 | Christensen | Mar. 31, 1931 |
| 2,199,038 | Brix-Hansen | Apr. 30, 1940 |
| 2,259,841 | Spiegl | Oct. 21, 1941 |
| 2,575,374 | Walsh | Nov. 20, 1951 |
| 2,597,515 | Nitsch | May 20, 1952 |
| 2,651,186 | Murphy | Sept. 8, 1953 |
| 2,720,085 | Boyle | Oct. 11, 1955 |
| 2,753,694 | Trow | July 10, 1956 |
| 2,787,133 | Moe | Apr. 2, 1957 |
| 2,788,643 | Martin | Apr. 16, 1957 |
| 2,803,950 | Bayston | Aug. 27, 1957 |
| 2,877,632 | Chaplik | Mar. 17, 1959 |
| 2,902,839 | Marshall | Sept. 8, 1959 |
| 2,943,461 | Davis | July 5, 1960 |